United States Patent [19]

Kessler

[11] 4,129,929

[45] Dec. 19, 1978

[54] PROCESS FOR THE MANUFACTURE OF ELECTRICAL STACK OR LAYER CAPACITORS

[75] Inventor: Hartmut Kessler, Regensburg, Germany

[73] Assignee: Siemens Aktiengesellschaft, Berlin & Munich, Germany

[21] Appl. No.: 818,674

[22] Filed: Jul. 25, 1977

[30] Foreign Application Priority Data

Aug. 31, 1976 [DE] Fed. Rep. of Germany ....... 2639184

[51] Int. Cl.² .............................................. H01G 4/30
[52] U.S. Cl. .................................. 29/25.42; 242/56.1
[58] Field of Search ...................... 29/25.42; 242/56.1; 361/309

[56] References Cited

U.S. PATENT DOCUMENTS

| | | | |
|---|---|---|---|
| 3,477,126 | 11/1969 | Price | 29/25.42 X |
| 3,670,378 | 6/1972 | Behn et al. | 29/25.42 |

Primary Examiner—Carl E. Hall
Attorney, Agent, or Firm—Hill, Gross, Simpson, Van Santen, Steadman, Chiara & Simpson

[57] ABSTRACT

An economical means for manufacturing stack or layer capacitors is disclosed wherein a metallized synthetic material band is separated lengthwise into films of the width needed for a capacitor, and by turning these films 90° by means of appropriate rollers and laying them on top of one another on a collecting plate or a collection disk and then further processing them as a film packet unit into capacitors.

14 Claims, 3 Drawing Figures

PROCESS FOR THE MANUFACTURE OF ELECTRICAL STACK OR LAYER CAPACITORS

BACKGROUND OF THE INVENTION

1. Field of the Invention

The invention concerns a process for the manufacturing of electric stack or layer capacitors in which master condensers several times the length of a single capacitor are produced, whereby the metal layers for the capacitor layers are applied at least partially laterally offset against each other onto stretched synthetic films with elastic memory, and are completely covered by sprayed metal and are thereby frontally contacted. Individual capacitors are sawed away from the master capacitor in such a way that through the heating process during sawing, the synthetic films are destretched in the region of the saw edges and the metal layer is thereby ripped open into islands which are insulated from one another. In this fashion the coatings are insulated from each other.

2. Description of the Prior Art

Such a process is known from German Pat. No. 1,764,541 corresponding to U.S. Pat. No. 3,670,378. There, a capacitor film is wrapped onto a large diameter drum. When the required number of layers for the master capacitor has been reached, covering films and separating layers are wrapped, whereupon a second master capacitor is produced on the first. The finished capacitor which is created in this way is completely covered on its front sides by sprayed-on metal layers and thereby contacted. It is separated into single capacitors in the circumferential direction along the separating layers and in radial direction by saw cuts.

SUMMARY OF THE INVENTION

It is an object of this invention to economize the manufacture of such layer capacitors.

According to the invention, at least one metallized synthetic band several times as wide as the individual capacitors to be produced is cut lengthwise into capacitor films of the width required for the capacitor. The capacitor films run over at least a first guide roller or a first guide pin and at least a second guide roller or second guide pin, the axes of which are perpendicular to each other for twisting the capacitor films. The capacitor films which are thus twisted are stacked on top of each other and brought together and pressed against each other through a collection disk or collection plate or through a suitable outlet in the direction of the film travel in the collection area, and thereby united into a film packet unit.

The film packet unit is advantageously wrapped onto the collection disk as one or several master capacitors stacked on top of one another, whereby one turn of the separating plies and, if need be, the covering plies, is wrapped between the master capacitors each time. The starting capacitor which is formed in this way is frontally contacted by means of sprayed-on metal layers so that these sprayed-on metal layers fully cover the front sides of the finished capacitor. The master capacitors are separated from each other into individual capacitors in the circumferential direction along the separating layers and in the radial direction through saw cuts.

An especially economical fabrication of condensers with larger capacity values is made possible when two or more capacitor bands are cut into capacitor films. These films are each turned 90° and brought to the same collection disk, collecting plate or collection area, laid on top of one another, and pressed against each other, so that a film packet unit is formed which contains the films of several synthetic material bands.

A precise setting of the desired number of turns is possible, since only a portion of the capacitor films is wrapped onto the collection disk, the other portion being supplied, for example, via a guide roller on a reserve roll or a second collection disk.

A loosening of the wound-on turns of the film packet unit is avoided, in that the collection disk is swung away before the separating of the film packet unit after winding at its winding position. A second collection disk is then pivoted into the winding position, the film packet is clamped, and only then is a connecting piece between the collection disks cut. An especially economical fabrication results when the film packet unit is produced with the number of films required for one capacitor. One strand from the required covering film and the separating film are then simultaneously wound in together. In this way, a spiral shaped master capacitor is produced. After the frontal contacting, the uppermost ply of the spiral shaped master capacitor is loosened from the plies located beneath it by pressure in the axial direction against the front sides along the separating plies. The ply is then sawed up into individual capacitors. The pressure in the axial direction is effected in a simple manner by a lateral guiding of the spiral shaped master capacitor on the way to the sawing mechanism.

The specified process is especially advantageous for the production of very large numbers of identical master capacitors. A large number of types are advantageously produced by using conventional wheel winding machines. In this case, the film packet unit which is produced according to the invention, is taken off the collecting plate or, after a partial winding around of the collection disk is taken off therefrom and rolled onto reserve rolls. From there it is wound off in a later process and wound into master capacitors. For high capacity values, several film packet units are advantageously wound onto the reserve rolls in this process; and in a further procedure the film packet units are simultaneously wound from the reserve rolls onto a collection disk. Accordingly, the number of windings per master capacitor in the case of the typical capacitor sizes and synthetic material band widths is reduced to approximately four to forty windings. Simultaneous rolling on of four film packet units results in approximately 1 to 10 windings being required for typical capacitor sizes. Thus, spiral shaped master capacitors can be made in the specified manner also on the usual wheel-winding machines. In addition, the reserve rolls can easily be submitted to further treatment, e.g. storage at a higher ambient temperature. The rolling onto the reserve rolls is also easily done if the film packet unit is to be divided into two or more reserve rolls so that the number of windings in the master condenser can be set with the required precision.

Conventional capacitor designs require approximately 100 to 3000 synthetic films metallized on one side for each master capacitor. In the process according to the invention approximately 20 to 30 double plies are produced from one metallized synthetic band, so that only approximately 3 to 50 plies of film packet units are needed. These numbers can be reduced further by rolling together two or more film packet units onto one reserve roll.

In view of these possibilities, it is advantageous to have the film packet units joined with cover films and as a straight strand it is provided with sprayed-on metal layers and then sawed up into individual capacitors. In this continuous process of manufacturing layer capacitors, the desired number of films can be advantageously also set by rolling together film packet units with differing numbers of films.

In particular, spiral shaped master capacitors are advantageously manufactured with a device which contains a collection disk whose circumferential path displays approximately the form of a spiral of one winding.

To guide the films, especially in the manufacture of off-setting metal layers of the coating with opposite poles, it is advantageous if a device for carrying out the process according to the invention contains immediately before the collection disk guide pins whose axes run parallel to the axis of the collection disk wherein the guide pins have a lateral stop. However, the guides after the twisting area also can be equipped alone or additionally as guide pins with a lateral stop.

To secure the film packet units, a means of adhesion or a heat treatment can be employed in connection with pressure. This can be done, for example, on the collection disk.

Especially in the process of separating the spiral shaped master capacitors, the separating film can be rolled out, or, in the case of synthetic film which adheres well on one side, the separating film can be left at the coil and thereby at the individual capacitors. Thus the separating film can serve as a mechanical shield.

DESCRIPTION OF THE PREFERRED EMBODIMENTS

Figure 1:
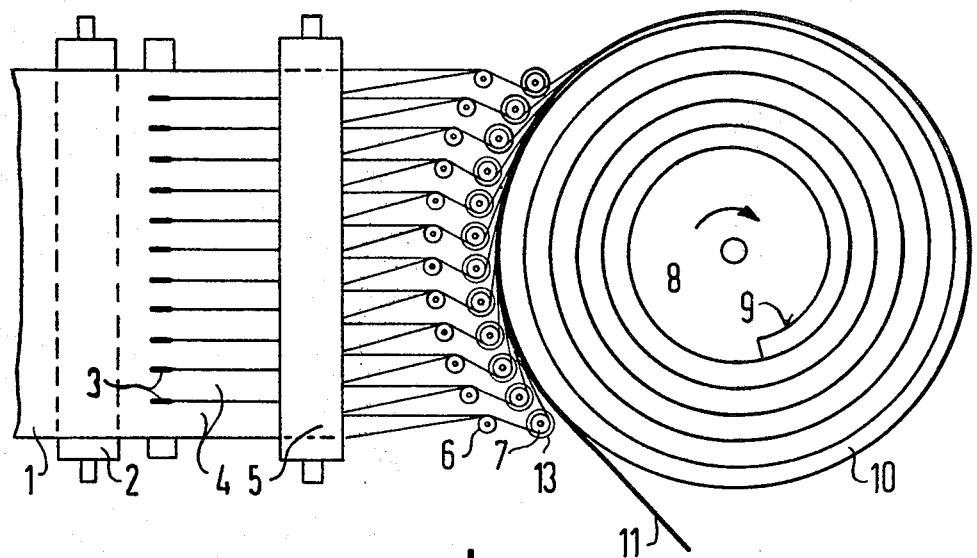
FIG. 1 schematically illustrates the process according to the invention wherein the collection disk is used to wind film packet units for layer or stack capacitors.

A metallized synthetic band 1 is guided over a guide roller 2 to a set of cutting razor blades 3 and thereby separated into individual capacitor films 4 with the width required for the capacitor.

These capacitor films are turned or twisted 90° by a guide roller or guide pin 5 and a set of guide rollers or guide pins 6 inside the twisting area 14. The axes of the guide rollers or guide pins 6 are situated in a direction which is perpendicular with respect to the axis of the guide roller or guide pin 5. The guided capacitor films 4 are supplied to a collection disk 8 via guide pins 7 all at the same angle. The guide pins 7 have stops 13 which bring the capacitor films into the desired position relative to each other. Instead of or in addition to the stops 13 the guide pins 6 can be formed into guide pins with stops. The collection disk 8 has a spiral shaped circumferential path 9 which corresponds to just one winding. A separating film 11 is wound on with the capacitor films. The separating film 11 projects on both sides over the capacitor films. Accordingly a spiral shaped master capacitor is created which, after Schoop's metal spraying process, can be divided into individual capacitors. The separating film 11 can be embedded between cover films of synthetic material before the winding on process. These synthetic cover films remain on the individual capacitors after the master condensers are divided.

Figure 2:
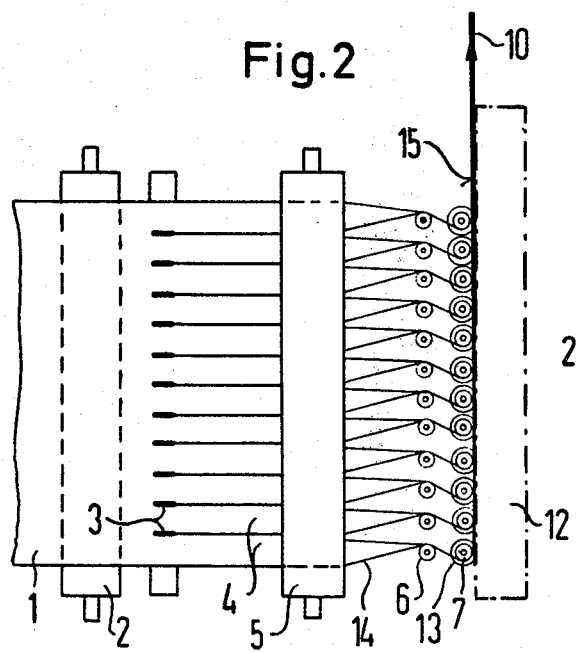
FIG. 2 shows the process of FIG. 1 in which a collector plate is used to shape the film packet units for layer or stack capacitors.

In FIG. 2 the condenser films 4 are guided by means of a collector plate 12 and pressed against each other and thus united into a film packet unit. This unit can, for example, be wound onto reserve rolls and processed on conventional wheel winding machines into master capacitors. With the film outlet direction drawn in FIG. 2 the bar can also be omitted. The pin series 7 then serves as a collection area in which the films are united into a film packet unit.

Figure 3:
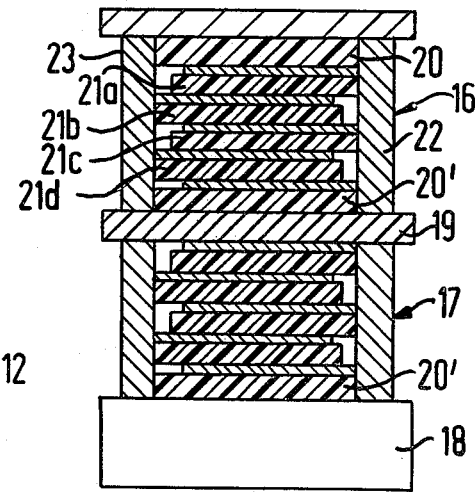
FIG. 3 is a cross-sectional view of two master capacitors wound on a collecting disk.

FIG. 3 illustrates master capacitors 16 and 17 on a collecting disk 18. A separating layer 19 separates the two master capacitors and one or more cover layers such as 20 (not metallized) or 20' (metallized) may be provided.

Master capacitor 16 includes offset cut films 21a, 21b, 21c and 21d with metallizations thereon. Frontal contact layers 22 and 23 are also provided.

Although various minor modifications may be suggested by those versed in the art, it should be understood that I wish to embody within the scope of the patent warranted hereon, all such embodiments as reasonably and properly come within the scope of my contribution to the art.

I claim:

1. A method for manufacturing electrical stack and layer capacitors in which master capacitors several times the length of a single capacitor are produced, comprising the steps of:
   (a) providing at least one metallized synthetic band of a width many times that of capacitors to be manufactured, said band comprising a stretched synthetic film with elastic memory;
   (b) cutting the synthetic band lengthwise into capacitor films corresponding to the width of a single capacitor;
   (c) providing first and second guide means whose axes are perpendicular to one another;
   (d) twisting each of the cut capacitor films by guiding them over the first and second guide means;
   (e) stacking the cut capacitor films each upon the other in a laterally offset manner at a collector means and pressing them against each other to form a film packet unit; and
   (f) frontally contacting the film packet unit by sprayed-on metal and sawing away individual capacitors, the heat from the sawing destretching the synthetic film in the region of the saw edges to rip the metal layers open into islands which are insulated from one another.

2. The method of claim 1 in which the cut capacitor films are twisted by roller means.

3. The method of claim 1 in which the cut capacitor films are twisted by pin means.

4. The method of claim 1 in which the cut capacitor films are wound around a collector disk.

5. The method of claim 1 in which the cut capacitor films are stacked against a collector plate.

6. A method as claimed in claim 1 including the further steps of winding the film packet unit onto a collection disk to form a plurality of master capacitors located one on top of the other; between the master capacitors winding on one turn of at least one separating ply during the winding of the master capacitors; frontally contacting the master capacitors by means of sprayed-on metal layers; the sprayed-on metal layers completely covering the front sides of the master capacitors; splitting up the master capacitors in a circumferential direction along the at least one separating ply and in a radial direction cutting individual capacitors by saw cuts.

7. A method as claimed in claim 1 in which at least two metallized synthetic bands are cut and the cut capacitor films are twisted by 90° and are laid on top of one another at the collector means and pressed against one another so that a film packet unit is formed which contains the capacitor films of at least two bands.

8. A method as claimed in claim 1, characterized in that a portion of the cut capacitor films are wound onto a collection disk and another portion is guided to a reserve collector means.

9. A method as claimed in claim 1, characterized in that the film packet unit is rolled onto a reserve roll and later wound off from the reserve roll to form a master capacitor.

10. A method as claimed in claim 1, characterized in that several film packet units are wound onto reserve rolls and in that in a later process the film packet units are simultaneously rolled off the reserve rolls and onto a common collection disk.

11. A method as claimed in claim 1 in which the film packet unit is wound on a collection disk, the collection disk is swung out of position after completion of winding and a second collection disk is swung into the winding position, the film packet unit is clamped at the wrapped and at the not yet wrapped second collection disk, and finally a connecting piece between the two collection disks is cut.

12. A method as claimed in claim 1 in which film packet units are produced and rolled onto a common disk building the desired number of capacitor films, a covering film and a separating film being wound on simultaneously above the film packet units, a master capacitor of spiral shape so being produced, frontal contacting the spiral shaped master capacitor completely, loosing the uppermost ply of the master capacitor from the plies underneath by means of pressure in an axial direction against a frontal side along the separating film and then sawing the uppermost ply into individual capacitors.

13. A method as claimed in claim 1 in which the film packet unit is joined with cover films and provided with sprayed-on metal layers for contacting in the form of a straight strand which is sawed up into individual capacitors.

14. A method for manufacturing electrical layer capacitors which are cut from master capacitors several times the length of each individual capacitor, comprising the steps of:
   (a) providing at least one metallized synthetic band of a width which is a multiple of the width of the master capacitor;
   (b) cutting the synthetic band lengthwise into capacitor films corresponding in width to the master capacitor;
   (c) twisting each of the cut capacitor films through approximately 90°;
   (d) stacking the cut and twisted films one upon the other in laterally offset manner to form a film packet unit;
   (e) forming frontal contacts on the film packet unit to produce the master capacitor; and
   (f) cutting the master capacitor to form individual capacitors.

* * * * *